United States Patent
Wong et al.

(10) Patent No.: US 8,584,131 B2
(45) Date of Patent: Nov. 12, 2013

(54) METHOD AND SYSTEM FOR MODELING AND ANALYZING COMPUTING RESOURCE REQUIREMENTS OF SOFTWARE APPLICATIONS IN A SHARED AND DISTRIBUTED COMPUTING ENVIRONMENT

(75) Inventors: Wai Ming Wong, Scarborough (CA); Michael C. Hui, North York (CA)

(73) Assignee: International Business Machines Corporation, Armonk, NY (US)

( * ) Notice: Subject to any disclaimer, the term of this patent is extended or adjusted under 35 U.S.C. 154(b) by 1510 days.

(21) Appl. No.: 11/694,664

(22) Filed: Mar. 30, 2007

(65) Prior Publication Data

US 2008/0244600 A1 Oct. 2, 2008

(51) Int. Cl.
G06F 9/46 (2006.01)
G06F 15/173 (2006.01)

(52) U.S. Cl.
USPC ........... 718/104; 718/100; 718/102; 718/105; 709/223; 709/224; 709/226

(58) Field of Classification Search
None
See application file for complete search history.

(56) References Cited

U.S. PATENT DOCUMENTS

| | | | | |
|---|---|---|---|---|
| 6,058,414 A * | 5/2000 | Manikundalam et al. | .... | 718/104 |
| 6,345,287 B1 * | 2/2002 | Fong et al. | ........... | 718/102 |
| 6,385,638 B1 * | 5/2002 | Baker-Harvey | ........... | 718/107 |
| 6,460,082 B1 * | 10/2002 | Lumelsky et al. | ........... | 709/226 |
| 6,769,112 B1 * | 7/2004 | Montana et al. | ........... | 717/101 |
| 7,082,606 B2 * | 7/2006 | Wood et al. | ........... | 718/102 |
| 7,114,159 B2 * | 9/2006 | Avvari et al. | ........... | 719/316 |
| 7,307,954 B1 * | 12/2007 | Strandberg et al. | ........... | 370/235 |
| 7,340,522 B1 * | 3/2008 | Basu et al. | ........... | 709/226 |
| 7,472,079 B2 * | 12/2008 | Fellenstein et al. | ........... | 705/26 |
| 7,594,015 B2 * | 9/2009 | Bozak et al. | ........... | 709/226 |
| 7,596,788 B1 * | 9/2009 | Shpigelman | ........... | 718/100 |
| 7,712,100 B2 * | 5/2010 | Fellenstein et al. | ........... | 718/104 |
| 7,743,378 B1 * | 6/2010 | Markov | ........... | 718/102 |
| 2005/0262506 A1 * | 11/2005 | Dawson et al. | ........... | 718/100 |
| 2006/0005181 A1 * | 1/2006 | Fellenstein et al. | ........... | 717/174 |
| 2006/0048157 A1 * | 3/2006 | Dawson et al. | ........... | 718/104 |
| 2006/0149842 A1 * | 7/2006 | Dawson et al. | ........... | 709/226 |
| 2007/0168970 A1 * | 7/2007 | Li et al. | ........... | 717/124 |
| 2010/0146515 A1 * | 6/2010 | Shpigelman | ........... | 718/104 |

* cited by examiner

*Primary Examiner* — Emerson Puente
*Assistant Examiner* — Charles Swift
(74) *Attorney, Agent, or Firm* — James L. Baudino; Libby Z. Toub

(57) ABSTRACT

An application manager for enabling multiple applications to share resources in a shared and distributed computing environment. The disclosed system provides for the specification, representation and automatic analysis of resource requirements of applications in a shared and distributed computing environment. The application manager is provided with service specifications for each application, which defines the resource requirements necessary or preferred to run said application (or more precisely, its constituent application components). In addition, the resources may be required to have certain characteristics and constraints may be placed on the required resources. The application manager works in conjunction with a resource supply manager and requests the required resources be supplied for the application. If there are appropriate and sufficient available resources to meet the particular resource requirements, then the resources are allocated, and the application components mapped thereon. The disclosed system can enable the sharing of resources among multiple heterogeneous applications. The systems can allow resource sharing without application source code access or any knowledge of the internal design of the application. Integration of an application can be re-used for other similar applications. Furthermore, the disclosed system enables the dynamic and efficient management of shared resources, providing an agile resource infrastructure adaptive to dynamic changes and failures.

39 Claims, 5 Drawing Sheets

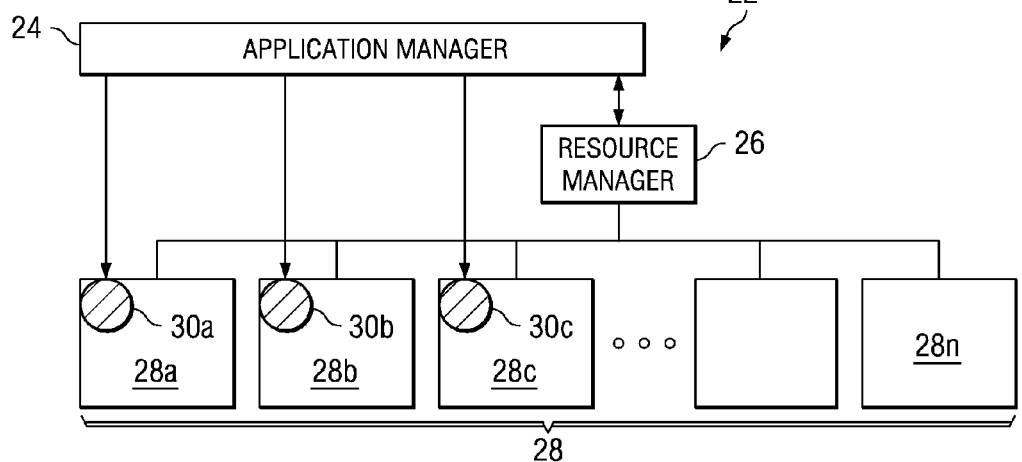
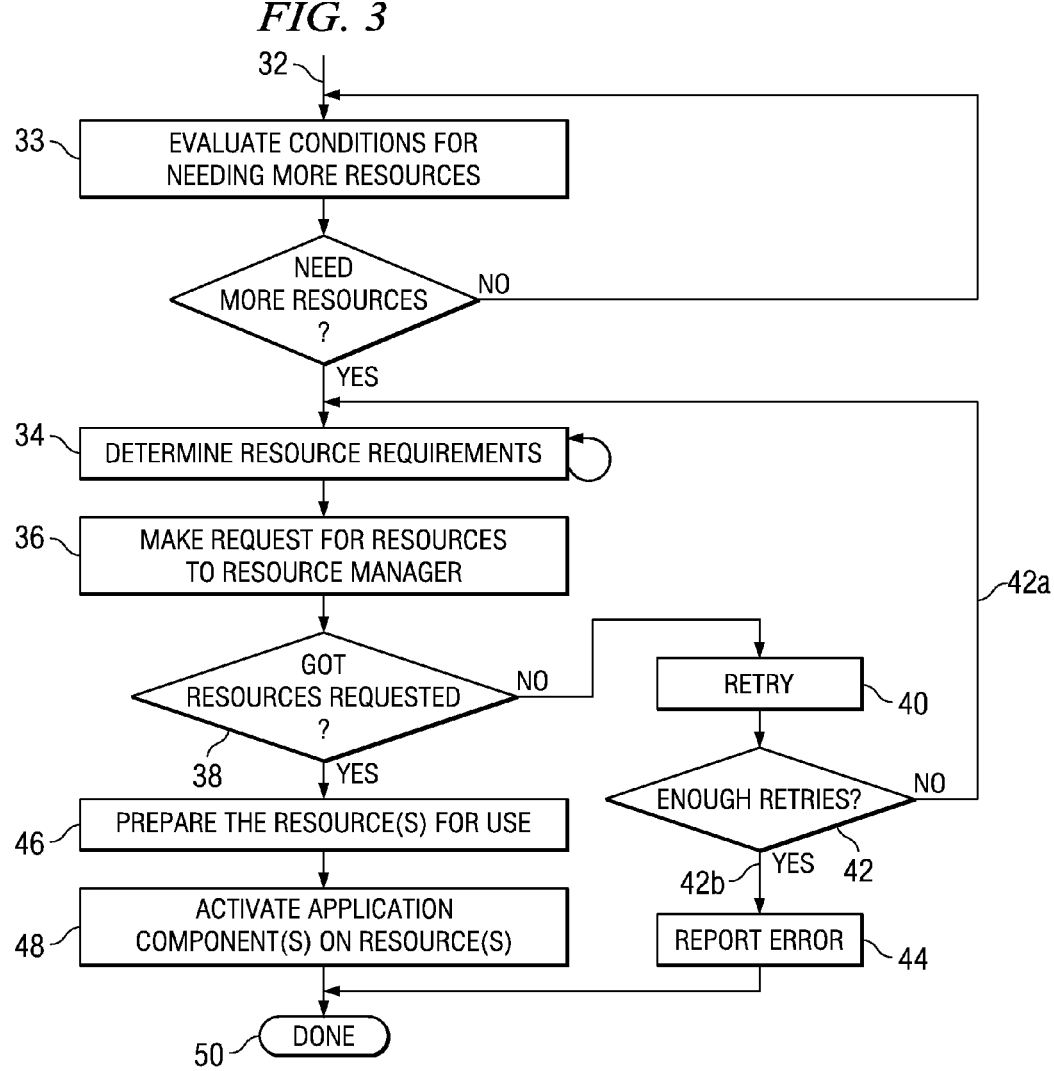

METHOD AND SYSTEM FOR MODELING AND ANALYZING COMPUTING RESOURCE REQUIREMENTS OF SOFTWARE APPLICATIONS IN A SHARED AND DISTRIBUTED COMPUTING ENVIRONMENT

FIELD OF THE INVENTION

Disclosed herein is an invention relating to management of the demand for distributed computing resources used for running software applications in a shared computing environment. Disclosed herein are systems and methods for improving application performance and availability, and for allowing dynamic adjustments in the computing resources on which applications are hosted.

BACKGROUND

Generally speaking, a shared computing environment can include hardware and software infrastructure configured to form an organization comprised of multiple distributed computing resources, which computing resources can be shared among the different users in the network. The computing resources may even be located in geographically disperse locations. In a traditional, computing environment or network where computing resources are not shared, an application is generally provided with a dedicated set of computing resources for running that particular application. In a shared and distributed computing environment (hereinafter generally referred to as shared computing environment), the distributed computing resources may be shared among different applications and this leads to several advantages. For example, such resource sharing can lead to increases in the utilization of particular computing resources, and accordingly, to a reduction in capital and operational expenditures. Resource sharing can also lead to improvements in fault tolerance for the application(s).

In the context of the present disclosure, software applications or software systems (generally referred to hereinafter as applications), generally comprise a set of potentially heterogeneous independent software components, each software component capable of running on a separate computing resource or device in the shared computing environment. Examples of such applications can include Java 2 Platform Enterprise Edition (J2EE) applications; client server applications; web server-based applications; file transfer protocol (FTP) services; Message-Oriented-Middleware (MoM) based applications; computational workload based applications, workload based application systems (such as Platform Load Sharing Facility™ (LSF) and Platform Symphony™, where the whole system is made up of a master node and a number of compute nodes); and executable programs. The applications are composed of a set of independent software components (referred to hereinafter as application components), each of which application components is capable of being run or hosted on a separate distributed computing device or resource, within a shared computing environment.

In order to be able to run an application, certain computing resources must be made available from the shared computing environment to host the application components of such application. In this context, computing resources (hereinafter generally referred to as resources) can encompass any types of computing resources within the shared computing environment that might be required in order for an application to be run, including hardware (such as servers, memory, central processing unit (CPU) time, mainframe computers, networks, network storage, scientific instruments, and other computing devices), as well as software, databases, software licenses, available network services and other non-hardware resources. Other possible examples of resources could include virtual machines (VM) managed by hypervisors and virtual private servers (VPS) supported by OS virtualization technologies. In a shared computing environment, the resources are generally available to be shared among the various applications that are run on the shared computing environment.

Prior art systems are known which attempt to address similar types of problems as described herein, such as how to share distributed resources, how to improve availability of applications and how to make on-demand adjustments of resources. However, the majority of these systems manage a specific type of application server all of which are running a specific type of application; such systems do not adopt a generic approach that will enable them to manage different types of distributed (heterogeneous) applications. Other systems purport to decouple the hardware and software for servers through the use of bare-metal machines and a mechanism to image/repurpose such machines; this involves a machine-centric approach rather than an application-centric approach to tackle the problems.

SUMMARY OF THE INVENTION

Described herein are methods and systems for enabling multiple applications to automatically share resources in a shared computing environment. The methods and systems enable such functionality without requiring the application computer code to be modified. More particularly, disclosed embodiments relate to an application manager for managing the resource requirements for applications in a shared computing environment.

A typical application comprises a set of software or application components (hereinafter referred to as application components), each of which application components is capable of being run/hosted on a separate resource in order for the application as whole to be run. Therefore, an application will have requirements for specific types of and/or numbers of resources which are necessary or preferred in order to host its constituent application components and in order for the application to be run. In addition, the resources may be required to have certain characteristics or attributes; certain constraints may also be placed on the required resources. The disclosed system comprises an application manager that works in conjunction with a resource supply manager (referred to herein as a resource manager). The resource manager generally manages the availability of resources within the shared computing environment. Within the context of this disclosure, it is contemplated that the resource manager could be any generic resource manager that may be used in a shared computing environment; one example of such a suitable resource manger is Platform Enterprise Grid Orchestrator™. When an application is to be initiated, the application manager determines the resources that are required and any applicable constraints that should be placed on the required resources. The application manager then makes a request for the required resources to the resource manager, which determines, in accordance with resource allocation policies, whether the requested resources are available within the shared computing environment. If there are appropriate and sufficient available resources to meet the particular resource requirements, and the resource manager determines the requested resources should be made available for the particular application, then the resources are allocated and mapped to the application, and the application (or more precisely, the application components) hosted thereon.

The system provides for the specification, representation and automatic analysis of resource requirements. The requirements for running an application are automatically translated into generic resource requests, which are made to the resource manager. Since the resource requests are translated into generic resource requests, the system can enable the sharing of resources among multiple heterogeneous applications.

To obtain the full benefits of the disclosed system and of resource sharing, multiple applications should be managed concurrently; without multiple applications, there cannot be resource sharing. In cases where the shared resources include third party products, the source code of such third party products and the applications running on them are often not accessible or require substantial time and effort in order to enable them for resource sharing purposes. The methods and systems disclosed herein can allow resource sharing even without application source code access or any knowledge of the internal design of the application, as long as there is a monitoring or management application programming interface (API) or other means to obtain metric data. The disclosed methods and systems provide a systematic, non-intrusive and easy-to-implement method of integrating applications so that they can run on the resources of the shared computing environment. Furthermore, an integration of an application can be re-used for other similar applications; common integration can be implemented once for an application and similar applications can be enabled with minimal additional effort—in some cases, possibly without programming. Once applications are integrated, they can be managed through a central management console, thereby substantially simplifying the administration of all applications running on the shared computing environment.

Furthermore, the disclosed system enables the dynamic and efficient management of shared resources. Disclosed herein is a system that provides an agile resource infrastructure adaptive to dynamic changes and failures. Since multiple applications are being concurrently run and managed on the shared computing environment, the number and types of available resources are dynamically changing, for example as resources from the pool of available shared resources are allocated to other applications or as resources are released back to the pool once other applications are terminated. In addition, the total number of resources in the pool of shared resources may itself change from time to time, as resources are integrated into or removed from the shared computing environment.

BRIEF DESCRIPTION OF THE DRAWINGS

Reference is made to the following descriptions taken in conjunction with the accompanying drawings.

FIG. 2 is a diagrammatic representation of the system showing the application manager as part of a shared computing environment;

FIG. 3 is a flowchart depicting the interactions at the disclosed system;

DETAILED DESCRIPTION OF THE INVENTION

Described herein are methods and systems for enabling multiple applications to automatically share a pool of computing resources in a shared computing environment. Enabling applications for resource sharing requires a method for specification, representation, and automatic analysis of resource requirements.

Figure 1:
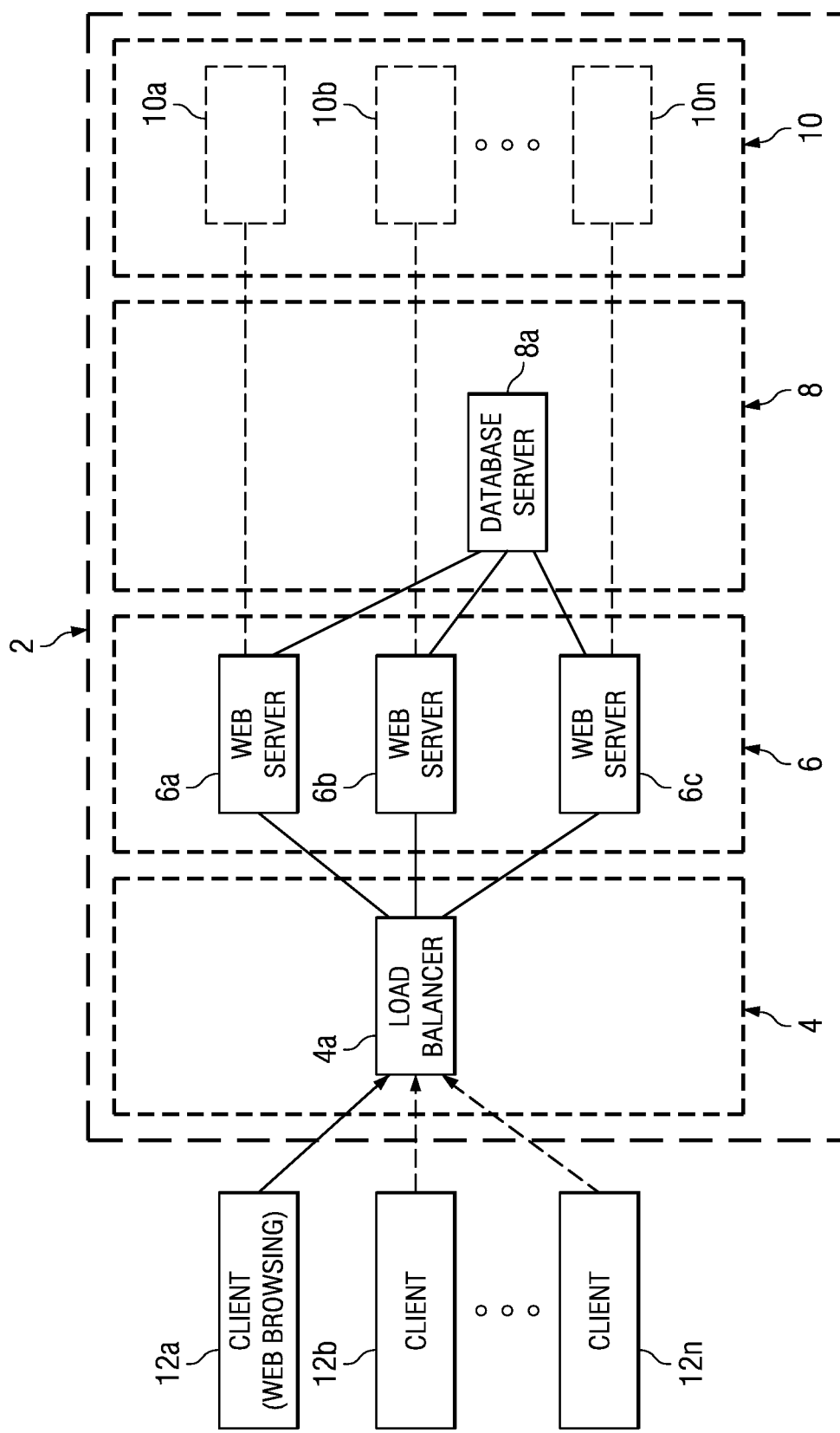
FIG. 1 is a diagrammatic representation of the resource requirements for an exemplary simple application.

By way of example only, FIG. 1 illustrates the component resources 1 that might be required to host a simple application 2, and how the component resources interrelate to each other. In this example, the application could be a simple web application. An application comprises a set of application components (each of which is typically a software module/service). The application 2 is specified as comprising the following application components: a load balancer, web or application servers (three identical instances) and a database; how the application components interrelate to each other may also be specified. The application components need suitable resources on which they may be hosted. FIG. 1 depicts the corresponding resources needed to host the application components, and hence, run the application 2. The resources required for the application include a load balancer 4a, three web server machines 6a, 6b and 6c, and a database server machine 8a. Different required (or preferred) arrangements for the resources are possible, and these will typically be pre-defined, for example according to the anticipated demand or web traffic. If the required resources are available, the application may be launched and run on such resources, with each resource hosting the appropriate application component of the application. The running (active) web application 2 can then be accessed by various clients via their web browsers 12a, 12b . . . 12n (the load balancer 4a can manage such access by the clients). FIG. 1 illustrates an example of the required resource arrangements for a relatively simple application. It should be appreciated that the required resources for an application may be less or significant more complex. An application may require multiple additional resource components 10a, 10b, . . . 10n. An application may require multiple instances of particular application components and thus, multiple instances of particular resources. An application may have multiple additional tiers of required resources (the application 2 of FIG. 1 is made up of three tiers 4, 6 and 8).

In the present disclosure, the system manages the resource requirements for multiple applications in a shared computing environment. Each application has particular resource requirements (or preferences), for example, along the lines of that shown in FIG. 1.

FIG. 2 is a diagrammatic representation of an exemplary system 22, showing an application manager 24. The application manager 24 of the present system operates in conjunction with a resource supply manager 26 of the shared computing environment. The resource manager 26 manages the availability of a pool of various shared resources 28 in the shared computing environment. The application manager 24 is provided with information regarding the resource requirements for running the application components (and therefore the application as a whole). This information is provided in the form of service specifications which are stored in service descriptors (typically in the form of an extensible markup language (XML) file). The service specification may specify particular hardware types (for example, a load balancer machine, three web server machines, etc.), the required attributes or characteristics therefor (for example, must be running a particular operating system, have at least a certain amount of memory, have a certain CPU speed, have a certain swap space, etc.), as well as any non-hardware requirements (for example, must be running a particular piece of software or must have a specific software license available). The requirements may also specify particular constraints related thereto. For example, a fairly typical constraint may specify or prefer that application components should be hosted on separate resources (e.g., separate physical machines), so as to minimize the impact in the event of a resource failing (no single point of failure). Additionally, where there are multiple instances of a particular application component to be hosted on a limited number of resources, the constraints may specify that the instances should to the extent possible be spread evenly among the resources (hence performing a load balancing type function). Additionally, the constraints may specify or prefer that certain application components be hosted on particular resources or groups of resources—for example, where certain resources are particularly suitable for hosting particular types of application components, or where there is a preference that certain application components be hosted on the resources belonging to (but which are nevertheless shared in the shared computing environment) a particular department or geographical location. The constraints can specify which specific resources or types of resources an application component can be hosted on; in some situations it may be more appropriate and/or efficient to specify which resources or types of resources an application component cannot be hosted on. Furthermore, constraints may also be specified in terms of other components of the same application or in terms of a different application altogether, i.e. the application components should not be placed on the same resource. Generally speaking, the efficiencies of resource sharing are greater where there are fewer constraints. The resource requirements may be as general or specific as considered appropriate, depending on what is considered necessary (or preferable) to run the application.

In the example shown in FIG. 2, a particular simple application comprises three application components. The application manager 24 evaluates what the resource requirements are for the particular application and makes a request for suitable resources to the resource manager 26. The resource manager applies resource allocation policies to determine whether the requested resources are available in the shared computing environment. If all the requested resources are determined to be available, these are allocated to and made available for the application; the application components are mapped to such resources. The application can then be launched by deploying the application components 30a, 30b and 30c on the allocated resources 28a, 28b and 28c.

In the event that the requested resources for running an application are not available, a service specification may provide for the possibility of "relaxing" the resource requirements; the fewer constraints placed on the requested resources, the more likely that the request will be satisfied. For example, a particular web application may prefer to have five instances of an application component hosted on five web servers, but it may yet be satisfactory to have only two instances of the application component hosted on two web servers.

It should be appreciated that although, for ease of reference, generally only a single application is depicted herein, in operation, the application manager 24 manages a plurality applications (more particularly, the resource demands of a plurality of applications).

Although each application component is generally shown herein as being hosted on a separate resource, it should be appreciated that it is possible to permit two or more application components to be hosted on the same single resource. That being said, as mentioned above, in practice it may often be appropriate to require or prefer that each application component be hosted on a separate resource, since this reduces the risk that the failure of one resource will cause a running application to completely fail (hence improving the availability of applications); this will be particularly applicable in the case of critical application components where the failure of such components could result in the entire application being disabled.

The disclosed system is capable of enabling the resource sharing of different applications types (heterogeneous applications), including, for example, J2EE, client-server (e.g. Tuxedo™), web server based, MoM based (e.g. EMS), or computation workload based (e.g. Condor™ and PBS™) applications.

Alternatively, multiple instances of the disclosed system may be implemented on a shared computing environment, with each instance of the system managing a particular type of application—each with its own particular demand-side semantics and implementation mechanisms.

The system can optionally provide for different applications to be designated different priorities. When applications have competing interests for the resources, the application manager can take the respective priorities of the competing applications into account when deciding which application to allocate resources to or which application to terminate/decommission when resources have to be returned to the pool. (It should be appreciated that this prioritization is in addition to any prioritization that the resource manager itself might apply when determining whether requested resources should be allocated to competing applications).

Provided below is some additional detail regarding the disclosed system. The system provides the following several basic functions, which are discussed in greater detail below:
  "hosting" applications on the shared computing environment;
  "adjusting" resource demand for applications automatically based on application specific criteria; and
  "managing" the applications that are participating in resource sharing.

Hosting. If a suitable resource(s) in the shared computing environment is determined to be available, an application component can be hosted on such resource. Commonly, additional steps may be necessary in order to prepare the resource before it can host the application component (for example, software may have to be downloaded, installed and/or configured). There can be two possible approaches, both utilizing known techniques, The first involves use of provisioning and configuration tools, such as Opsware™; the second involves the use of a virtual machine (VM). With provisioning tools, the process of downloading and installing the required software onto the allocated resource host can be automated. For example, where the application manager requests a host to run a web server, and the resource manager has allocated a suitable resource, the application manager then invokes the provisioning tools to install the web server and to download the configuration file onto the allocated resource. Then the web server is started. With the VM approach, the web server and the corresponding configurations can be prepared in VM images. Upon the application manager's request, the virtual machine is started on a physical host selected by the resource manager and the web server is configured to start once the virtual machine starts.

As an additional optional feature of the disclosed system, the service specification can define the order in which application components are deployed on the resources once the application is ready to be deployed; for example, for a web application, one could normally provide for the database server machine to be running, before the application component on the web servers are run.

Adjusting Resource Demand. When an application comprises or may comprise multiple instances of one or more identical application components, the service specification of the disclosed system can express dynamic conditions in which resources for the application can be changed. The service specification can specify which application components can be adjusted and how they may be adjusted. These conditions can either be user-defined or predetermined. Actions resulting from such conditions may also be user-defined or predetermined actions. For example, referring to the architecture previously discussed for FIG. 1, a web application comprises three identical instances of a web server application component which are to be hosted on the three web servers (machines), in addition to one instance of a load balancing application component to be hosted on a load balancer and one instance of an database application component to be hosted on a database server machine. The service specification of the application may require or prefer that there be 2 to 5 instances of the web server application components hosted on the web servers. In this case, the number of instances of such application component can be dynamically adjusted in accordance with changing conditions. By way of example only, if web traffic exceeds a threshold level, more web servers (or resources that have the attributes to function as web servers) may be requested and additional instances of such application component initiated on the additional servers to meet the increased traffic; similarly, if web traffic declines, one instance of the application component may be terminated so that the corresponding resource can be returned to the pool of resources and potentially used for other applications. If it is determined that resources for the application need to be adjusted, the system maps or unmaps resources of the affected application components.

Managing Applications. An additional benefit of the disclosed system is the greater ease of managing the applications participating in resource sharing. Once the attributes of the application have been specified, complex operations can be initiated by a simple command. For example, in practice an entire multi-tier J2EE infrastructure application can be run on the shared resources with a click of the mouse.

From a user's perspective, some of the high-level user operations supported by the system include:
  Register and deregister applications
  Deploy the entire application onto the shared computing environment
  Decommission the entire application
  Incrementally deploy/decommission application components based on performance policies
  Query on deployed applications
  Report vital statistics on deployed applications
  Manage demand policies on deployed applications
  Manage events and notifications As indicated above, the system can provide for one or multiple (typically complex) applications to be deployed on the shared computing environment or terminated/decommissioned by a single command; the system may also allow for incremental deployment or decommissioning of application components. In addition, various application monitoring and application management functionality may be provided for. In practice, application management operations may be facilitated by the use of a graphical user interface. In addition, the status of running applications or of the resources on which application components are being hosted can be monitored by the system and appropriate action taken; for example, if an instance of an application component or the entire application has failed, steps can be taken to redeploy or terminate the application component instance or the entire application.

In the disclosed system, resource sharing and demand adjustments of dissimilar applications are made possible through:
  1. dynamic late-binding of applications to resources;
  2. unified, generic and flexible model for representing application characteristics and resource requirements; and
  3. automated rule-based runtime adjustments of resources.

Dynamic late-binding of resources. It is common practice when configuring computing resources to configure these for specific applications; dedicated compute hosts are assigned to particular applications. In the context of the present disclosure, and in the context of a shared computing environment, applications are decoupled from the resources they need in order to have maximum flexibility in fulfilling resource requirements. The disclosed system performs dynamic runtime late-binding of resources to applications. This late binding of resources can have the effect that resources are not "taken" from the shared pool of resources unless all the required resources required to run an application are available and it is determined that the application can be deployed on said resources. The system performs the following high-level steps during runtime for resource binding:
  determine which application needs resources;
  determine what resources are required and their characteristics and constraints;
  make request(s) to resource manager with detailed requirements;
  if resource is provided, prepare the resource for use;
  activate the application component on the resource.
Similarly, the system unbinds the resources from application components when resources are no longer needed.

Generic model. A generic object-based approach is used to model any application participating in sharing of resources. Through the use of dynamic object introspection on the model entities and design conventions, a generic system can be built to automatically manage resource requirements of many types of applications through a centralized management console. At a high-level, there are only a few entities in the model:
  Every application is a managed service or a composite managed service (simply called service and composite service here on)
  A composite service needs other services (sub-services) to operate.
  Each service is described by a service specification.
  Service specifications are stored in service descriptors.
  Each service uses some resources.
  Resources are represented by managed objects.
  Both services and managed objects expose a set of attributes and actions.
  Attributes can be static properties and dynamic metrics.

Managed services and managed objects are similar to objects in the Object-Oriented programming paradigm where an object has instance variables (attributes) and methods (actions) defined by the corresponding class (service specification). A managed service object has properties, metrics and actions. An action is further defined by programmatic logic packaged in a software module like a script and an executable file. As with the Object-Oriented programming paradigm, the service specification is user-defined. Users are free to define any number of properties, metrics and actions, although some of the managed service life-cycle actions must be defined for the service to be activated properly based on the characteristics of the service itself. For example, some services may require the "prepare" action but some others may not. This is purely service dependent; it is not restricted by the disclosed system itself. In one implementation, the specification may be implemented in XML format where a GUI is used to allow users to create and edit such service specifications. Describing services as objects allows users maximum flexibility in capturing the key characteristics of the services to be deployed on the shared computing environment. Due to the highly customizable nature of this model, object introspection is supported for both services and managed objects where the attributes and actions of a particular object can be dynamically queried and invoked during runtime. This allows the possibility of a single application manager to be developed to handle a wide variety of services. To the application manager, all external or remote services running on remote hosts in the shared computing environment are uniformly represented internally as managed service objects defined by their corresponding service specifications. The life-cycle state of each internal managed service object mirrors the corresponding remote service running on a remote host in the shared computing environment. The same concepts apply to managed objects which are internal representations of external or remote resources like a compute host in the shared computing environment. New resource types (managed object specifications) can easily be introduced without changing the application manager itself.

The high-level user operations supported by the system include:

Register, deregister, update and query service descriptors
Deploy a service or a composite service
Decommission a service or a composite service
Incrementally deploy/decommission a service based on performance policies
Query on deployed services
Report vital statistics on deployed services
Manage performance policies on deployed services
Manage events and notifications FIG. 3 is a flowchart illustrating some of the basic interactions at the application manager of the disclosed system. The application manager evaluates whether conditions have arisen where more resources are needed (block 33). For example, this may arise simply as a result of an application being initiated. This could also arise when certain conditions occur that may trigger a requirement for additional resources (for example, where it is determined that additional instances of application components should be initiated in response to increased demand). If resources are required, the resource requirements for the application are determined (block 34). Then a request (block 36) for the required resources for the application(s) is made to the resource manager. The resource manager will determine whether the requested resources are available, by applying resource allocation policies. If insufficient resources are available at that time (path 38a), the system may try again to request resources from the resource manager (since additional resources may have become available, given that the available resources are dynamically changing as they become released back to the pool from or allocated to other applications in the shared computing environment)(path 42a). Although this step is not specifically shown in FIG. 3, where requested resources are not available, the system can also provide for the possibility of adjusting/ "relaxing" the resource requirement and then trying again to obtain resources based on such relaxed requirement. If more than a preset number of unsuccessful resource requests have been made, then the error is flagged and reported (block 44). If the resource manager determines that there are sufficient numbers of and appropriate types of resources available, then the required resources are mapped onto the available resources (the available resources are allocated to the application)(path 38b). If necessary, the resources may additionally be prepared for use; for example, this may involve installing, downloading or configuring a suitable operating system or any other software, which is necessary in order to host the respective application component of the application (block 46). Once the resources are prepared, the application components are activated on the resources and the application deployed thereon (block 48). A particular application may run indefinitely, or it may terminate once certain conditions have been satisfied, in which case, the resources can be returned to the pool of shared resources (block 50).

Figure 4:
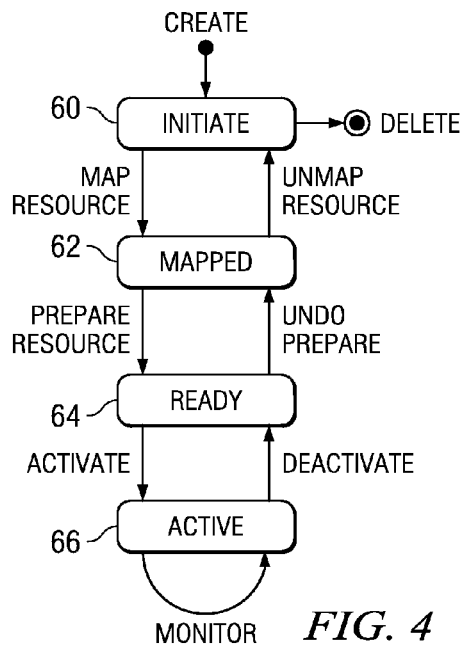
FIG. 4 is a state diagram depicting the life cycle states and state transitions for an application component being managed by the application manager of the disclosed system.

FIG. 4 is a diagram illustrating the life cycle states and state transitions for an application component being managed by the application manager. The INIT, MAPPED, READY and ACTIVE blocks (blocks 60, 62, 64 and 66) represent the states of an application component. The transitions between these states (arrows) correspond to managed service actions which take the application component from one state to another. An instruction is received to initiate an application component (block 60). The application manager creates a managed service instance representing the instance of the application component. If the required resource is available, then the application component is mapped on the allocated resource (block 62). Following this, the resource is prepared for use, if necessary. (This "PREPARE RESOURCE" managed service action corresponds to block 46 in FIG. 3 above). This may, for example, involve downloading, installing and/ or configuring software code, possibly through the use of external provisioning tools. When the resource has been prepared, the application component is in a READY state (block 64). Next the application component is activated and put into an ACTIVE state. (This "ACTIVATE" managed service action corresponds to block 48 in FIG. 3 above). At this point, the application component is running/deployed on the allocated resource component. Each application component goes through the above life cycle in order to become activated. While the application component is running on the resource, it is monitored; appropriate actions can be taken in the event certain conditions occur (for example, if the instance of the application component has failed). The figure also illustrates corresponding actions to DEACTIVATE, UNDO PREPARE and UNMAP RESOURCES, following which the application component is terminated, the managed service of the instance of the application component is deleted from the application manager, and the allocated resource returned to the pool of shared resources.

Figure 5:
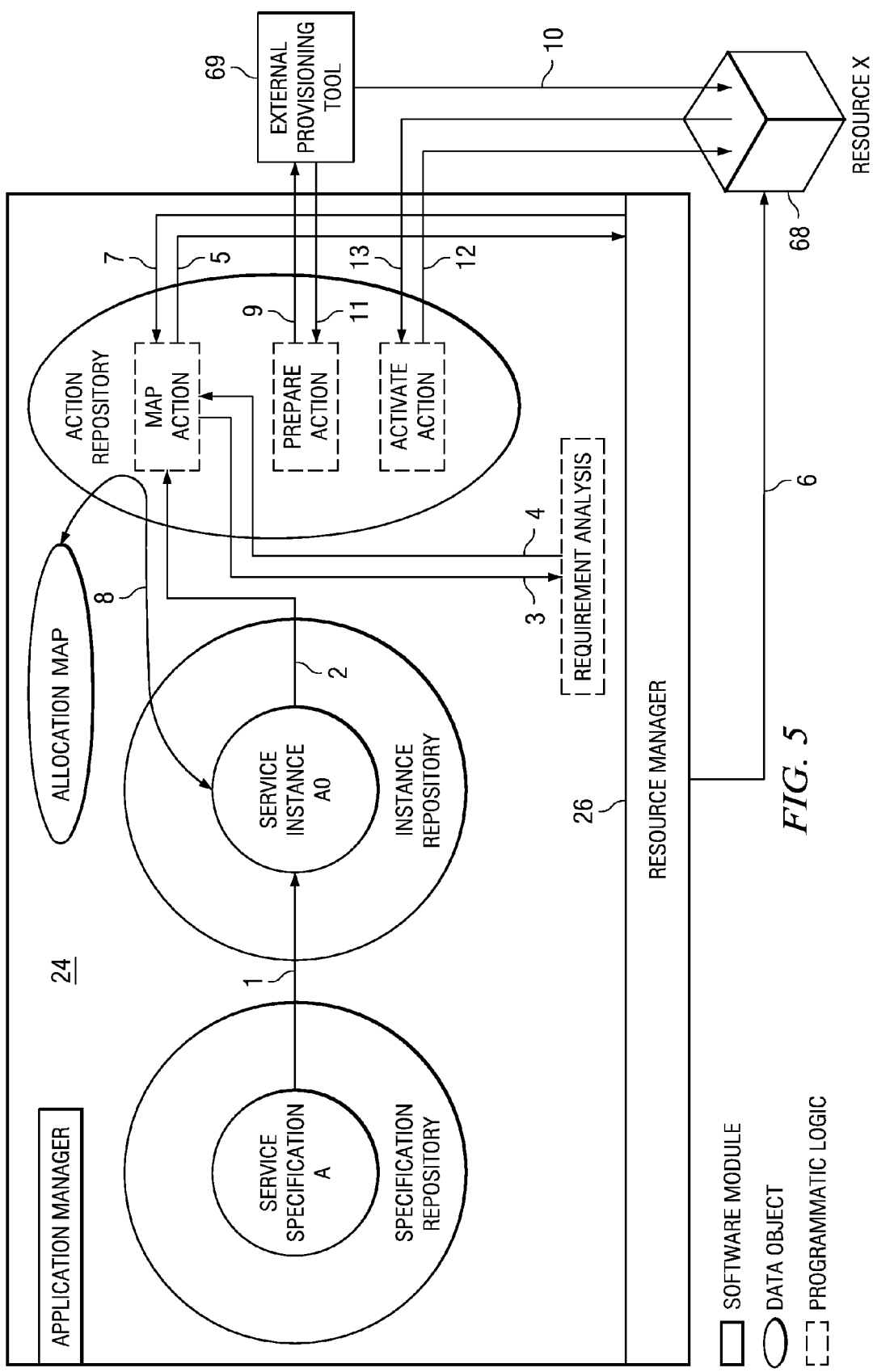
FIG. 5 is a diagrammatic representation of the workflow at the application manager when a service is being activated.

FIG. 5 illustrates, at a high level, the workflow at the application manager 24 when a service is being activated, and is essentially an alternative representation of the life cycle states shown in FIG. 4. The workflow is as follows:

1. When a service A is to be activated, an instance of its specification is created (A0).
2. The MAP action is invoked to obtain the necessary resources.
3. MAP action in turn invokes the requirement analysis logic passing to it the instance repository and the allocation map describing what resources are mapped to known services at this time.
4. The requirement analysis returns a set of constraints for requesting resources.

5. A request is sent to the resource manager 26 for a resource along with the determined constraints.

6. The resource manager collects metrics on managed hosts periodically. Based on its resource allocation policy, a resource X 68 is selected to run/host service instance A0.

7. The resource manager 26 returns resource X 68 to the MAP action logic.

8. The appropriate data objects are updated to reflect the newest allocation.

9. With MAP action successful, the PREPARE action is invoked. In this example, an external provisioning tool 69 is invoked to install and configure the required software for service A onto resource X 68.

10. The provisioning tool 69 communicates with resource X 68 to do the actual preparation.

11. The provisioning tool reports the successful preparation of the resource X 68.

12. The ACTIVATE action is invoked to start the service on resource X.

13. The service is reported to be successfully started.

For composite services, the above process is repeated for each component of a composite service.

Figure 6:
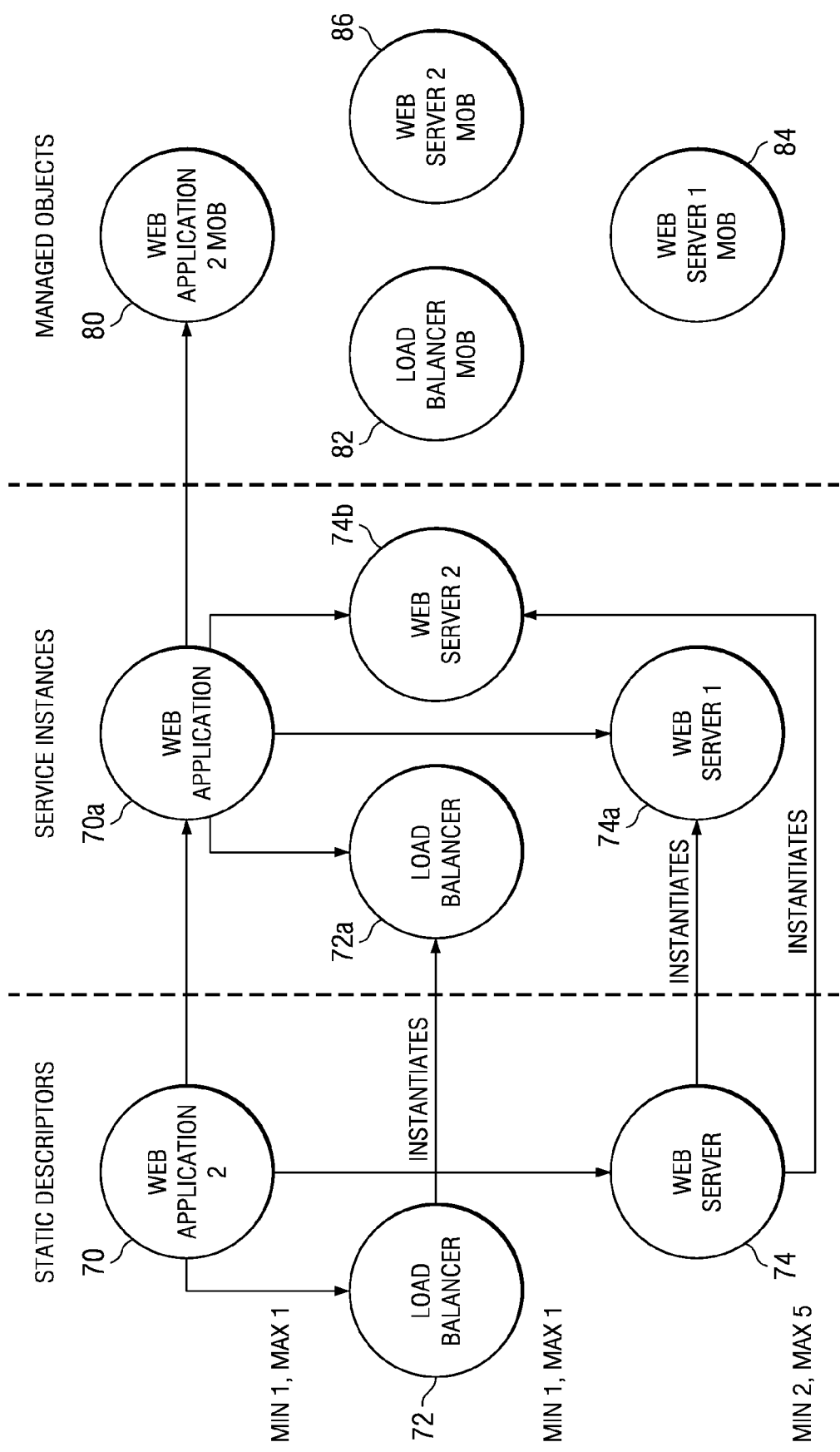
FIG. 6 is a diagram depicting the main objects of the system and their high-level relationships.

FIG. 6 illustrates how an application is represented in the memory of the application manager 24, and depicts the main objects of the system and their high-level relationship. The static descriptors 70, 72 and 74 are used to represent an application to the application manager. An application, in this case a web application, is made up of two types of components, specifically a load balancer and a web server. The service specification in the service descriptor specifies that there is to be one load balancer and between 2 to 5 instances of the web servers making up the application. For every instance of the application components, the application manager goes through the life cycle states shown in FIG. 4 using the applicable service descriptors to create the instance running on a suitable resource. Once this is done, the application (or its application components) is deployed and running on the resources. The service instances 70a, 72a, 74a and 74b are internal representations in the application manager of the resources that are actually hosting the application components. Managed objects 80, 82, 84 and 86 are the internal objects representing the resources on which each application component is being hosted.

Figure 7:
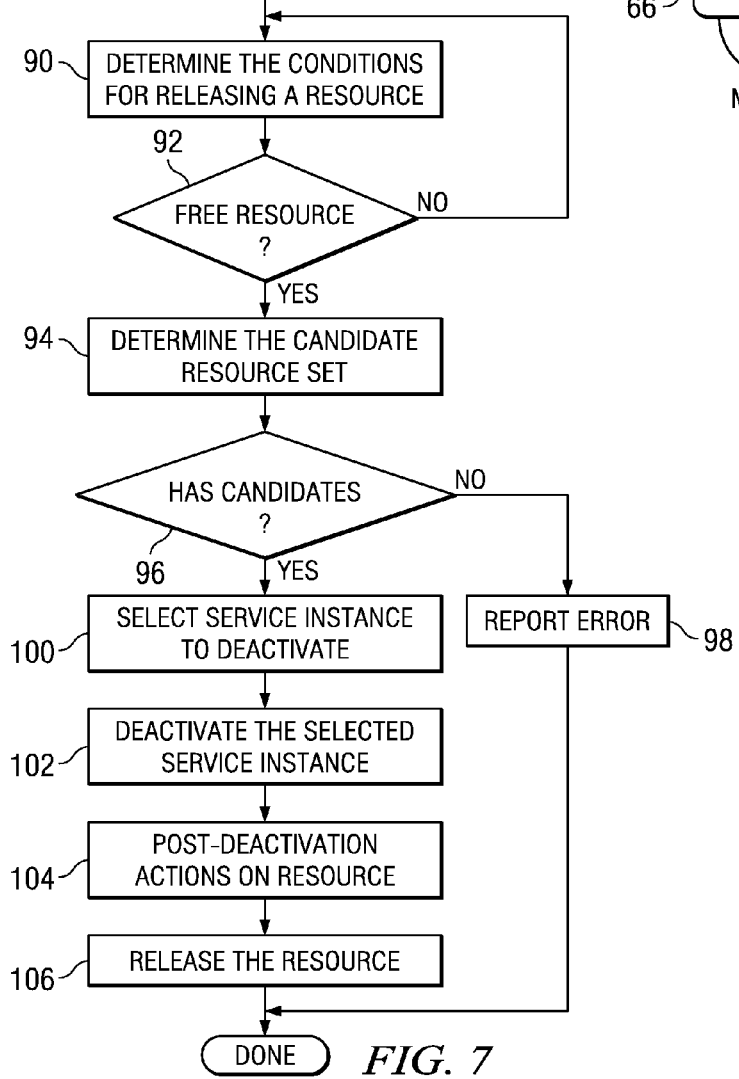
FIG. 7 is a flowchart depicting the interactions at the disclosed system for releasing a resource.

FIG. 7 is a flowchart depicting the interactions at the application manager for releasing a resource on which an instance of an application component is running. The application manager determines what the conditions are for releasing a resource, and whether such conditions exist (block 90 and 92). Such conditions could include, for example, that the utilization of/demand for a particular application component is such that the number of instances of such application components may be reduced, or the resource manager may request the application manager to return certain types of resources. If it is determined that resources should be released, then the application manager compiles a candidate resource set, i.e. those resources that could be released (block 94). If there are no suitable candidate resources, then the condition may be flagged and/or reported as an error (block 98). If there are suitable candidate resources, the application manager may select the instance(s) of an application component (service instance) to deactivate (block 100). The selected instance of an application component is deactivated (block 102). Any post deactivation actions, where appropriate, are performed on the resource (e.g. remove any unnecessary software, operating systems, etc.). The resource is then released back to the shared pool of resources.

While various embodiments of an application manager and a system incorporating an application manager have been described above, it should be understood that these have been presented by way of example only, and not limitation. Multiple inventions may be set forth according to the limitations of the multiple claims associated with this disclosure, and the claims accordingly define the invention(s), and their equivalents, that are protected thereby. In all instances, the scope of the claims shall be considered on their own merits in light of the specification.

What is claimed is:

1. A system for managing a plurality of applications in a shared computing environment, each application comprising a plurality of application components, the system comprising a processor and:
   a) an application manager operable to receive or define a service specification for a first application that defines a set of required computing resources that are necessary to run each application component of the first application; and
   b) a resource supply manager in communication with the application manager and operable to manage a plurality of computing resources in the shared computing environment;
   wherein the application manager is operable to request the set of required computing resources from the computing resource supply manager, and wherein the resource supply manager determines the availability of the required computing resources within the shared computing environment according to resource allocation policies and allocates computing resources to the application manager, and wherein the application manager is operable manage allocation of the computing resources to the first application, the application manager operable to create and manage deployment of instances of each application component of the first application on the allocated computing resources; and wherein the service specification defines an acceptable range for the number of instances for at least one of the plurality of application components.

2. The system of claim 1, wherein the plurality of applications are generally of heterogeneous types.

3. The system of claim 1, wherein the service specification also defines a set of constraints for the required computing resources, and wherein the application manager takes the constraints into account when requesting the set of computing resources from the resource supply manager.

4. The system of claim 3, wherein the constraints defines what computing resources can or cannot be allocated to the application manager to run the application components of the first application.

5. The system of claim 3, wherein the application manager can take into account the constraints of the first application in relation to the constraints of each other application when requesting the set of required computing resources from the resource supply manager.

6. The system of claim 3, wherein the constraints define the required computing resources in such a fashion that the application does not have a single point of failure.

7. The system of claim 1, wherein the service specification defines a priority for one or more of the plurality of applications, and wherein the application manager manages the plurality of applications taking into account said priorities.

8. The system of claim 1, wherein the number of active instances of the at least one of the plurality of application components is permitted to be dynamically adjusted within the acceptable range, in response to changing conditions while the application is being run.

9. The system of claim 1, wherein the number of active instances of the at least one of the plurality of application components is permitted to be dynamically adjusted within the acceptable range, in accordance with changes in supply of and demand for computing resources in the shared computing environment.

10. An application manager installed on one or more computing devices, the one or more computing devices comprising a processor, the application manager operable to:
   manage a plurality of applications in a shared computing environment, each application comprising a plurality of application components, the shared computing environment having a resource supply manager for managing a plurality of computing resources in the shared computing environment;
   receive or define a service specification for a first application that defines a set of required computing resources that are necessary to run each application component of the first application, wherein the service specification defines an acceptable range for the number of instances for at least one of the plurality of application components;
   request the set of required computing resources from the resource supply manager, wherein the resource supply manager determines the availability of the required computing resources in accordance with resource allocation policies and allocates computing resources to the application manager;
   manage allocation of the computing resources to the first application; and
   create and manage deployment of instances of each application component of the first application on the allocated computing resources.

11. The application manager of claim 10, wherein the plurality of applications are generally of heterogeneous types.

12. The application manager of claim 10, wherein the service specification also defines a set of constraints for the required computing resources, and wherein the application manager takes the constraints into account when requesting the set of computing resources from the resource supply manager.

13. The application manager of claim 12, wherein the set of constraints defines what computing resources can or cannot be allocated to the application manager to run the application components of the first application.

14. The application manager of claim 10, wherein the service specification defines a priority for one or more of the plurality of applications, and wherein the application manager manages the plurality of applications taking into account said priorities.

15. The application manager of claim 10, wherein the number of active instances of the at least one of the plurality of application components is permitted to be dynamically adjusted within the acceptable range, in response to changing conditions while the application is being run.

16. The application manager of claim 10, wherein the number of active instances of the at least one of the plurality of application components is permitted to be dynamically adjusted within the acceptable range, in accordance with changes in supply of and demand for computing in the shared computing environment.

17. The application manager of claim 10, wherein the plurality of applications are adaptive for running in a heterogeneous resource environment.

18. A method for managing a plurality of applications in a shared computing environment having a share pool of computing resources, each application comprising a plurality of application components, the method comprising the steps of:
   a) receiving at an application manager a service specification for a first application wherein the service specification defines a set of required computing resources that are necessary to run the first application, wherein the service specification defines an acceptable range for the number of instances for at least one of the plurality of application components;
   b) requesting by the application manager the required computing resources through a resource supply manager, the resource supply manager for managing a plurality of computing resources in the shared computing environment, wherein the availability of the required computing resources within the shared computing environment is determined and allocated by the resource supply manager to the application manager according to resource allocation policies, and each of the application components for the first application are mapped to a corresponding allocated computing resource by the application manager where the required computing resources are determined to be available;
   c) preparing each corresponding allocated computing resource for running the respective application components of the first application;
   d) running the first application on the allocated computing resources by deploying and managing, by the application manager, instances of each application component of the first application on the corresponding allocated computing resource; and
   e) repeating steps a) to d) for each successive one of the plurality of applications.

19. The method of claim 18, comprising the additional steps of terminating at least one of the plurality of applications by terminating each instance of the corresponding application components for said application and releasing the allocated computing resources to the share pool of computing resources of the shared computing environment.

20. The method of claim 18, wherein the plurality of applications are generally of heterogeneous types.

21. The method of claim 18, wherein the service specification also defines a set of constraints for the required computing resources, and wherein the application manager takes the constraints into account when requesting the set of computing resources from the resource supply manager.

22. The method of claim 21, wherein the constraints define what computing resources can or cannot be allocated to the application manager to run the application components of the first application.

23. The method of claim 18, wherein the service specification defines a priority for one or more of the plurality of applications, and wherein the application manager manages the plurality of applications taking into account said priorities.

24. The method of claim 18, wherein the number of active instances of the at least one of the plurality of application components is permitted to be dynamically adjusted within the acceptable range, in response to changing conditions while the application is being run.

25. The method of claim 18, wherein the number of active instances of the at least one of the plurality of application components is permitted to be dynamically adjusted within the acceptable range, in accordance with changes in supply of and demand for computing resources in the shared computing environment.

26. The method of claim 18, comprising the additional steps of the application manager monitoring for instances of failure the status of the allocated computing resources on which each application component is running, and where there is an instance of failure, restarting the application component that has failed on the corresponding allocated computing resource.

27. The method of claim 18, comprising the additional steps of the application manager monitoring for instances of failure the status of the allocated computing resources on which each application component is running, and where there is an instance of failure, requesting a replacement computing resource from the resource supply manager and restarting the application component that has failed on the corresponding replacement computing resource.

28. The method of claim 18, wherein the plurality of applications are adaptive for running in a heterogeneous resource environment.

29. A method for managing a plurality of applications in a shared computing environment having a share pool of computing resources, each application comprising a plurality of application components, the method comprising the steps of:
   a) receiving at an application manager a service specification for a first application wherein the service specification defines a set of required computing resources that are necessary to run the application components of the first application, wherein the service specification defines an acceptable range for the number of instances for at least one of the plurality of application components;
   b) for each respective application component of the first application,
      i) requesting by the application manager a corresponding required computing resource through a resource supply manager, the resource supply manager for managing a plurality of computing resources in the shared computing environment, wherein the availability of the corresponding required computing resource within the shared computing environment is determined and allocated by the resource supply manager to the application manager according to resource allocation policies;
      ii) where the corresponding required computing resource is determined to be available, mapping by the application manager the application component of the first application to a corresponding allocated computing resource;
      iii) preparing the corresponding allocated computing resource for running the respective application component of the first application; and
      iv) deploying and managing by the application manager instances of the respective application component of the first application on the corresponding allocated computing resource; and
   c) repeating steps a) to b) for each successive one of the plurality of applications.

30. The method of claim 29, comprising the additional steps of terminating at least one of the plurality of applications by terminating each corresponding instance of the respective application components for said application and releasing each allocated computing resource to the share pool of computing resources of the shared computing environment.

31. The method of claim 29, wherein the plurality of applications are generally of heterogeneous types.

32. The method of claim 29, wherein the service specification also defines a set of constraints for the required computing resources, and wherein the application manager takes the constraints into account when requesting the set of computing resources from the resource supply manager.

33. The method of claim 32, wherein the constraints define what computing resources can or cannot be allocated to the application manager to run each application component of the first application.

34. The method of claim 29, wherein the service specification defines a priority for one or more of the plurality of applications, and wherein the application manager manages the plurality of applications taking into account said priorities.

35. The method of claim 29, wherein the number of active instances of the at least one of the plurality of application components is permitted to be dynamically adjusted within the acceptable range, in response to changing conditions while the application is being run.

36. The method of claim 29, wherein the number of active instances of the at least one of the plurality of application components is permitted to be dynamically adjusted within the acceptable range, in accordance with changes in supply of and demand for computing resources in the shared computing environment.

37. The method of claim 29, comprising the additional steps of the application manager monitoring for instances of failure the status of the allocated computing resources on which each application component is running, and where there is an instance of failure, restarting the application component that has failed on the corresponding allocated computing resource.

38. The method of claim 29, comprising the additional steps of the application manager monitoring for instances of failure the status of the allocated computing resources on which each application component is running, and where there is an instance of failure, requesting a replacement computing resource from the resource supply manager and restarting the application component that has failed on the corresponding allocated resource.

39. The method of claim 29, wherein the plurality of applications are adaptive for running in a heterogeneous resource environment.

* * * * *